United States Patent Office 3,040,108
Patented June 19, 1962

3,040,108
STABILIZATION OF PERCHLOROETHYLENE
Donald H. Campbell, Niagara-on-the-Lake, Ontario, Canada, assignor to Hooker Chemical Corporation, Niagara Falls, N.Y., a corporation of New York
No Drawing. Filed Nov. 14, 1960, Ser. No. 68,599
2 Claims. (Cl. 260—652.5)

This application is a continuation-in-part of my copending application Serial Number 806,461, filed April 15, 1959, now U.S. Patent No. 2,998,461.

This application relates to the stabilization of chlorinated hydrocarbon solvents, such as dichloro-, trichloro- and perchloro-ethylenes. More particularly, this invention relates to the stabilization of perchloroethylene against the major types of solvent decompostion occurring in the industrial uses of this material, especially in metal degreasing. Accordingly, this invention will be explained using perchloroethylene and metal cleaning as the illustrative embodiments so that it may be more readily understood.

Perchloroethylene is widely used in industry for a number of purposes, some of which are: as a vapor degreasing solvent, as a drycleaning solvent, as a solvent in ultrasonic cleaners, and as a heat transfer medium. Perchloroethylene itself is a reactive chemical and in many of the uses of this material, it is exposed to air, light, a variety of metals often in finely divided state with reactive surfaces, heat, and a great many other reactive materials. Therefore, before perchloroethylene can be utilized in many of these applications, it must be stabilized by the addition of minor amounts of compounds which inhibit the decomposition of the perchloroethylene under its conditions of use. For example, when perchloroethylene is to be used as the solvent in the vapor degreasing process for cleaning metals, the conditions affecting solvent stability vary greatly from one degreasing operation to another and some of the factors influencing solvent stability call for much more stable solvents than generally provided in commercially available perchloroethylene. Thus, one may successfully and repetitively degrease the more inert metals, e.g. stainless steel, with solvent of average stability but decomposition can occur when the same solvent is repetitively used for the degreasing of the more active metals where there are large quantities of metal turnings and fines to be removed along with the other soils. The very large surface area and highly active strained surfaces of the metal fines, coupled with their tendency to build up around the heating coils of the degreaser to cut down solvent circulation and provide "hot-spots," all cause a severe strain on the stabilizing system of the perchloroethylene and thereby deleteriously affecting its satisfactory, efficient and continued use in the degreasing process.

The use of perchloroethylene as a paint thinner in paints such as in the hot dip paint process (United States Patents 2,515,489; 2,728,686; 2,728,952; 2,739,567; 2,783,165) or the flowcoat process (United States Patent 2,861,897) presents further problems in that the perchloroethylene is kept hot and in contact with metals and exposed to the many constituents of paints, such as the resins, driers, pigments, extender pigments, etc., over an extended period of time thereby deleteriously affecting its satisfactory, efficient and continued use in these processes.

Other uses of perchloroethylene present similar problems in that the conditions of use are such as to require careful stabilization if decomposition of the perchloroethylene is to be avoided.

The exact mechanism by which the perchloroethylene breaks down is not known, but it is generally considered that the major decomposition reactions are oxidation and metal catalyzed condensations. In any event, the need for a stabilizing system for perchloroethylene which would more satisfactorily inhibit the major decomposition reactions is well established.

One object of this invention is the provision of a novel and effective method of stabilizing perchloroethylene against the major types of decomposition reactions that take place under severe use conditions.

A further object is the provision of perchloroethylene stabilized by the inclusion therein of a combination of substantially co-boiling stabilizers which need only be present in relatively small concentrations, usually a fraction of one percent, such combination of stabilizers being remarkably effective in preventing the decomposition of perchloroethylene.

I have discovered that when tetrahydrofuran is present with N-methyl pyrrole, this stabilizer combination possesses markedly increased effectiveness as a stabilizer for perchloroethylene. Neither of these additives when used apart from each other is particularly effective under the conditions occurring at the onset of solvent decomposition. However, the combination is surprisingly effective, especially after the solvent has been used for its intended purpose.

The quantity of tetrahydrofuran used may be considerably larger than that of the more expensive N-methyl pyrrole, thus effecting appreciable saving in the stabilizer costs. Tetrahydrofuran may be used in the concentration of about 0.01 to 1.0 weight percent and preferably in the range of 0.1 to 0.5 weight percent. The N-methyl pyrrole may be used in the concentration of about 0.001 to 0.10 weight percent and preferably in the range of 0.01 to 0.05 weight percent. I have also found that the presence of other additives does not interfere with the synergistic stabilizing action of the N-methyl pyrrole-tetrahydrofuran combination of this invention.

The following test procedure was devised to evaluate the stabilities of perchloroethylene samples under conditions which simulate the conditions at the onset of decomposition. To accelerate the test such that it occurs within a practical length of time for evaluation, the perchloroethylene samples were tested for six hours at reflux temperatures in the presence of oxygen and a minor amount of aluminum chloride. In most uses of perchloroethylene, major causes of decomposition are due to metal catalysts or oxidation. Aluminum chloride was added to these samples, since it is one of the most vigorous of the metal catalysts and is a good material to indicate the effect of a metal catalyst on the samples used. The oxygen was added to determine resistance to oxidation and to facilitate measurement of the products of decomposition. The percentages given in the procedure and examples are by weight.

Dry oxygen was metered into each of the four test flasks which were 500 milliliter Erlenmeyer flasks with side inlet tubes extending to within one-eighth inch to one-quarter inch from the bottom. The flasks were mounted on small hot plates placed around and equidistant from an ultraviolet lamp (General Electric $AH_4$ 100 watt) and were surmounted by reflux condensers connected to gas washing bottles containing distilled water.

The perchloroethylene samples were placed in the test flasks along with anhydrous aluminum chloride. Oxygen at 120 milliliters per minute was passed through each flask and the contents heated under reflux for six hours. The gaseous products of decomposition were carried to the gas washing bottles by the oxygen stream and the quantities evolved determined by titration every hour with 0.1 N base. The major decomposition product being acidic, the greater the amount of acid evolved the greater the decomposition. At the end of the reaction time the oxygen flow was increased to 270 milliliters per minute for ten minutes. The reaction flasks were cooled and their contents filtered.

EXAMPLE

Four samples of unstabilized perchloroethylene (two hundred milliliters each), designated as Samples A, B, C and D, respectively, were each placed into one of four five-hundred milliliter flasks containing 1.2 grams of ammonium chloride powder and one gram of aluminum chips per flask. No stabilizer was added to Sample A. N-methyl pyrrole (0.01 percent by weight) was added to Sample B. Tetrahydrofuran (0.2 percent by weight) was added to Sample C. N-methyl pyrrole (0.0075 percent by weight), and tetrahydrofuran (0.15 percent by weight) were added to Sample D. Each flask was heated to reflux and illuminated with ultraviolet light while passing an oxygen stream into the sample to carry the evolved decomposition products up through the reflux condenser and into gas washing bottles containing distilled water. The solutions collected in the gas washing bottles were titrated with 0.1 N sodium hydroxide to measure the acid evolved from the flask as milliliters of 0.1 N acid. The results obtained were as follows:

| Sample | Stabilizer | Acids evolved as mls. 0.1 N) |
|---|---|---|
| A | No Stabilizer | 159 |
| B | 0.01% N-methyl pyrrole | 146 |
| C | 0.2% Tetrahydrofuran | 197 |
| D | 0.0075% N-methyl pyrrole plus 0.15% Tetrahydrofuran | 74 |

The results obtained in this example clearly demonstrate the surprising synergistic effect obtained by employing a mixture of N-methyl pyrrole and tetrahydrofuran (Sample D), as a stabilizer for perchloroethylene in accordance with the instant invention.

In like manner and with equally improved results, metals such as aluminum, steel, copper, etc., may be successfully degreased with perchloroethylene containing the stabilizer pair or combination of this invention.

Using the combination of this invention with other stabilizers which do or do not add to the synergistic effect would not depart from the spirit of this invention. Various other modifications and ramifications of this invention will occur to those skilled in the art upon a reading of applicant's basic invention. These are intended to be encompassed within the scope of this invention.

I claim:
1. The method of stabilizing perchloroethylene against decomposition which comprises incorporating in said perchloroethylene a stabilizer comprising in combination about 0.01 to 1.0 percent by weight of tetrahydrofuran and about 0.001 to 0.10 percent by weight of N-methyl pyrrole.
2. A composition comprising in combination perchloroethylene with about 0.01 to 1.0 percent by weight of tetrahydrofuran and about 0.001 to 0.10 percent by weight of N-methyl pyrrole.

No references cited.